US005755406A

United States Patent [19]
Aston et al.

[11] Patent Number: 5,755,406
[45] Date of Patent: May 26, 1998

[54] MODULAR, INDEPENDENT SUBSYSTEM DESIGN SATELLITE BUS AND VARIABLE COMMUNICATION PAYLOAD CONFIGURATIONS AND MISSIONS

[75] Inventors: Richard W. Aston, Brea; David B. Esposto, Redondo Beach; James J. Peterka, III, Rancho Palos Verdes, all of Calif.

[73] Assignee: Hughes Electronics, Los Angeles, Calif.

[21] Appl. No.: 577,441

[22] Filed: Dec. 22, 1995

[51] Int. Cl.⁶ ................................................. B64G 1/66
[52] U.S. Cl. .................................. 244/158 R; 244/158 A
[58] Field of Search ............................. 244/158 R, 161, 244/164, 172, 173, 158 A

[56] References Cited

U.S. PATENT DOCUMENTS

| | | |
|---|---|---|
| 4,009,851 | 3/1977 | Cable ........................... 244/158 R |
| 4,767,084 | 8/1988 | Chan et al. . |
| 5,314,146 | 5/1994 | Chicoine et al. ............... 244/158 R |
| 5,344,104 | 9/1994 | Homer et al. .................. 244/158 R |
| 5,349,532 | 9/1994 | Tilley . |
| 5,372,183 | 12/1994 | Strickberger ................ 244/158 R X |
| 5,443,231 | 8/1995 | Anzel . |
| 5,474,262 | 12/1995 | Fiore ............................. 244/158 R X |

Primary Examiner—William Grant
Attorney, Agent, or Firm—Terje Gudmestad; Elizabeth E. Leitereg; W. K. Denson-Low

[57] ABSTRACT

A space module has a base and one or more side walls attached to the base. A top panel is attached to the one or more side walls so that the base, the one or more side walls and the top panel enclose an interior volume of space which is physically divided into a first area and a second area which are thermally and structurally segregated from one another.

8 Claims, 11 Drawing Sheets

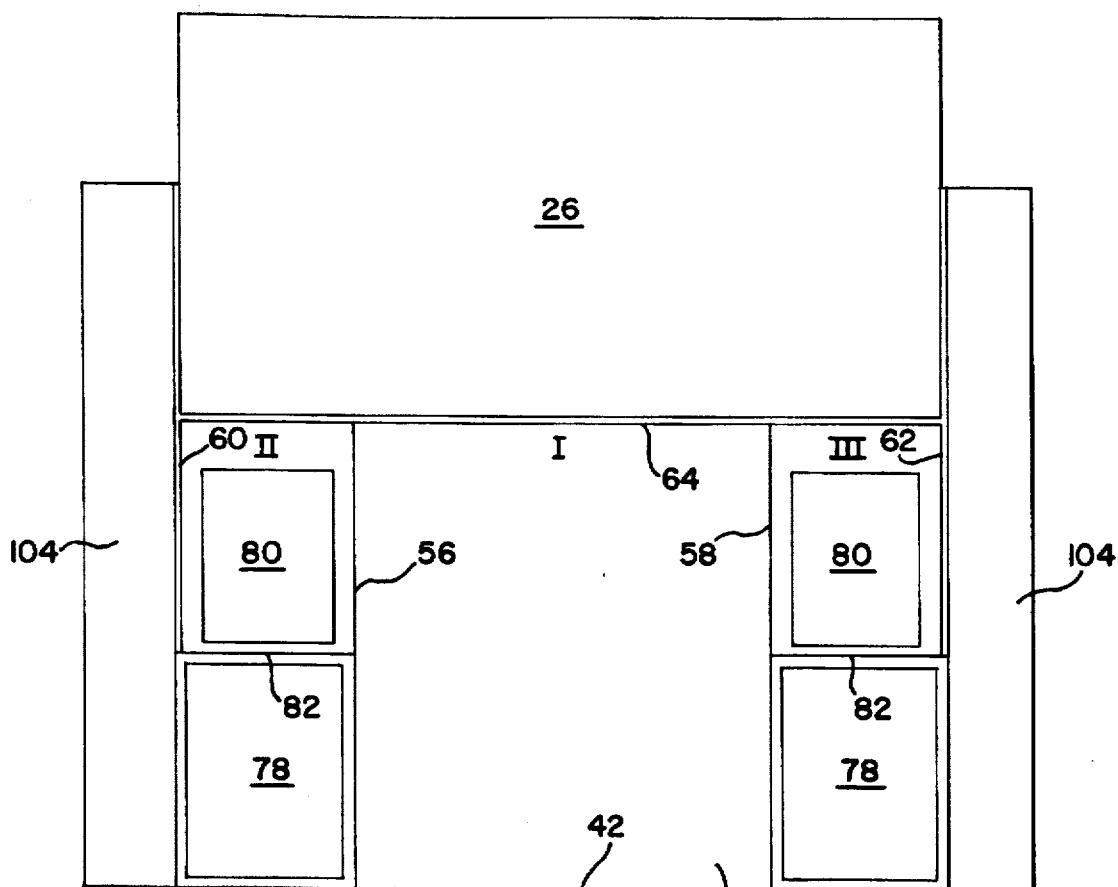
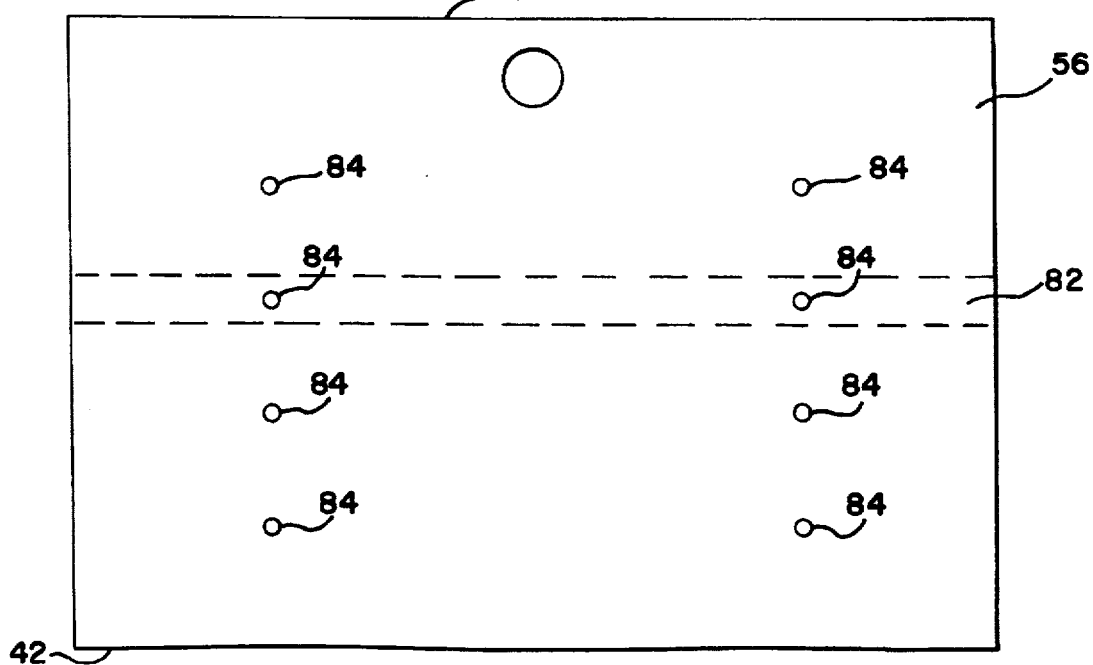

FIG.15
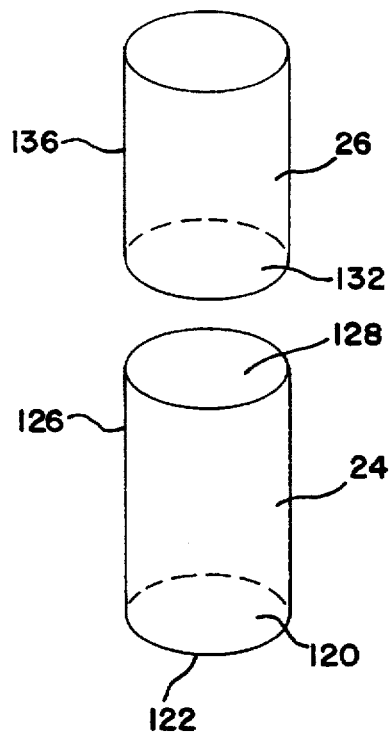
FIG.16A
FIG.16B
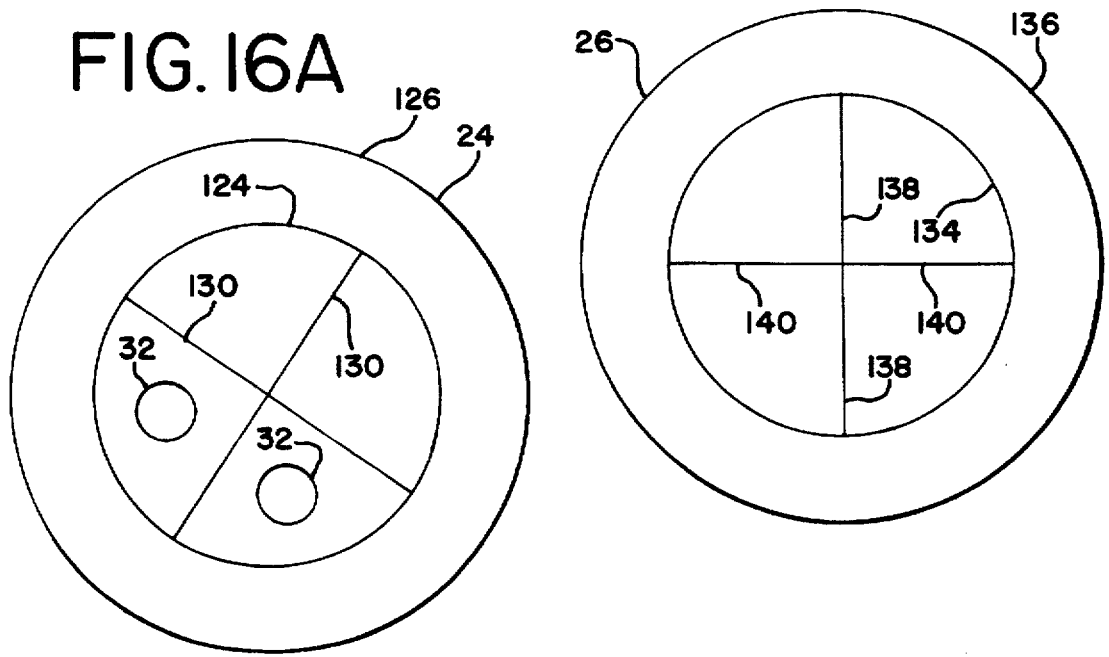

MODULAR, INDEPENDENT SUBSYSTEM DESIGN SATELLITE BUS AND VARIABLE COMMUNICATION PAYLOAD CONFIGURATIONS AND MISSIONS

BACKGROUND OF THE INVENTION

Currently, spacecraft or satellites are manufactured by housing the payload and bus subsystems within a common module. The manufacture of these modules is interdependent with the payload unit layout with respect to the thermal, power, signal, packaging, etc. systems onboard the spacecraft.

Interdependence of bus and payload units, in current designs, is such that new payload layouts affect bus unit layouts. This is undesirable from the standpoint of the redesign of bus unit layouts and support structure, which requires non-recurring and recurring costs, and increased cycle time.

Furthermore, the interdependence of the bus and payload unit layouts requires integrated tooling, assembly, testing and alignment of the satellite as a whole. This method does not allow construction of spacecraft until all bus and payload related requirements are satisfied, negating the opportunity for advance ordering and building of any of the spacecraft subsystems.

Although the manufacture of spacecraft modules has been adequate, there are, of course, areas that could use improvement. For example, segregation into separate modules results in parallel production, testing and a standard bus that can be fabricated in advance and in an efficient time frame. This permits a smaller factory to process the required capacities and reduces long lead times for completing the manufacture of a spacecraft. This individualized manufacturing will result in a decrease in hardware and labor costs.

SUMMARY OF THE INVENTION

The present invention provides a standardized bus module to which a standardized aft end of a payload module is attached. The bus module of the present invention has a structure that can lead to a more efficient method of constructing bus modules.

More particularly, the present invention concerns a bus module having a base, one or more side walls attached to the base and an interface attached to the one or more side walls, wherein the base, the one or more side walls and the interface enclose an interior volume of space. The interface has a structure designed to receive and attach itself to a substantial number of known satellite payload modules.

Another aspect of the present invention is a method of mass producing satellites which entails constructing a bus module having a standardized interface having an engagement device always arranged thereon at a predetermined and standard location on the interface. Next, a payload module is constructed to have an aft end which always has an attachment device arranged thereon at a position which corresponds to the position of the engagement device. Then, the payload module is attached to the bus module by having the attachment device engage the engagement element.

A third aspect of the present invention is a space module having a base and one or more side walls attached to the base. A top panel is attached to the one or more side walls so that the base, the one or more side walls and the interface enclose an interior volume of space which is physically divided into a first area and a second area which are thermally and structurally segregated from one another.

The above-described bus module structure allows for increased factory capacities for spacecraft or satellites. In addition, the disclosed invention will reduce the hardware and labor needed to complete a spacecraft or satellite so that the time to manufacture a satellite or spacecraft will be reduced The foregoing features and advantages of the present invention will be further understood upon consideration of the following detailed description of the invention taken in conjunction with the accompanying drawings, in which:

BRIEF DESCRIPTION OF THE DRAWINGS

FIG. 7 schematically shows a cross-section of the layout of the electrical components on the bus module of FIG. 3;

FIG. 8 shows a front view of a shelf to be used with the bus module of FIG. 3;

FIG. 15 shows a perspective view of a second embodiment of a bus module and a payload module according to the present invention;

FIG. 16A shows a cross-sectional view of the bus module of FIG. 15; and

FIG. 16B shows a cross-sectional view of the payload module of FIG. 15.

DESCRIPTION OF THE PREFERRED EMBODIMENT

Figure 1:
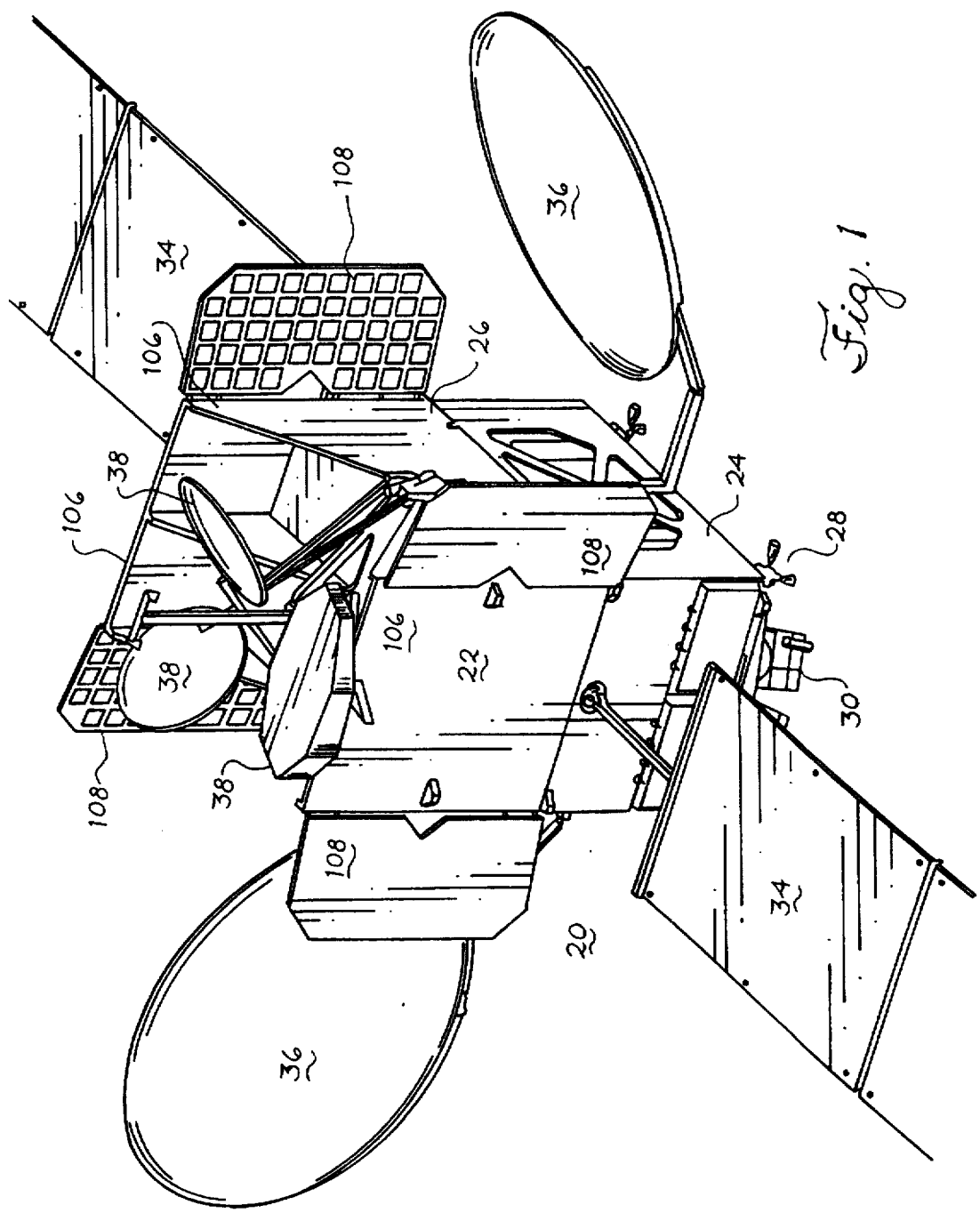
FIG. 1 shows a perspective view of a spacecraft or satellite body capable of employing a bus module and a payload module of the present invention.

A spacecraft or satellite 20 employing the present invention is shown in FIGS. 1-16. Satellite 20 has a spacecraft body 22 which includes a lower bus module 24 and an upper payload module 26. Attached to the aft end of the lower bus module 24 are a plurality of engines. These engines include a centrally positioned liquid orbital thruster (not shown) and four pairs of chemical propulsion engines 28 located at the corners of the bus module 24 and two pairs of xenon ion propulsion engines 30. Lower bus module 24 contains one or more fuel tanks 32 and various power and control modules which operate the propulsion system and power the payload module 26. Bus module 24 further includes a pair of solar panels 34 which convert sunlight into electricity which is sent to batteries (not shown) located on the bus module 24. Bus module 24 also has one or more antennae 36, and reflectors 38 which receive signals from one or more ground stations on Earth which are used to control the satellite 20. Antennae 36 and reflectors 38 also send signals to the ground stations.

Payload module 26 is attached to the bus module 24 and contains a variety of electronic equipment which may contain a number of sensors (not shown). The electronic equipment processes information gathered by the sensors and sends the processed information back to the ground stations via antennae 36 and reflectors 38. The gathered information may concern communications, weather observation, navigational information, etc.

Figure 2B:
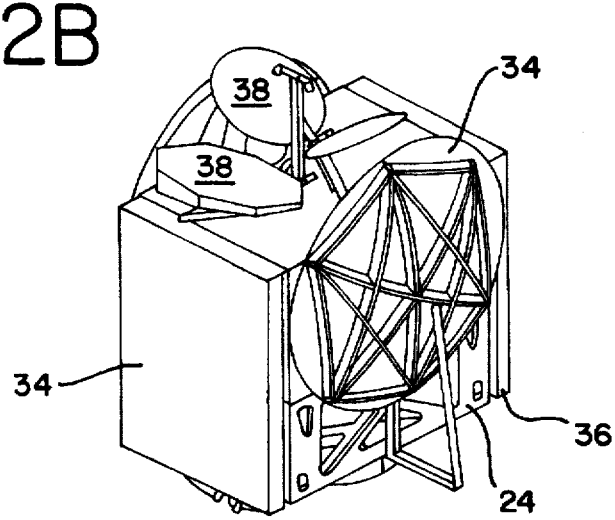
FIG. 2B shows the spacecraft or satellite body when the spacecraft has left the launch vehicle of FIG. 2A.
Figure 2A:
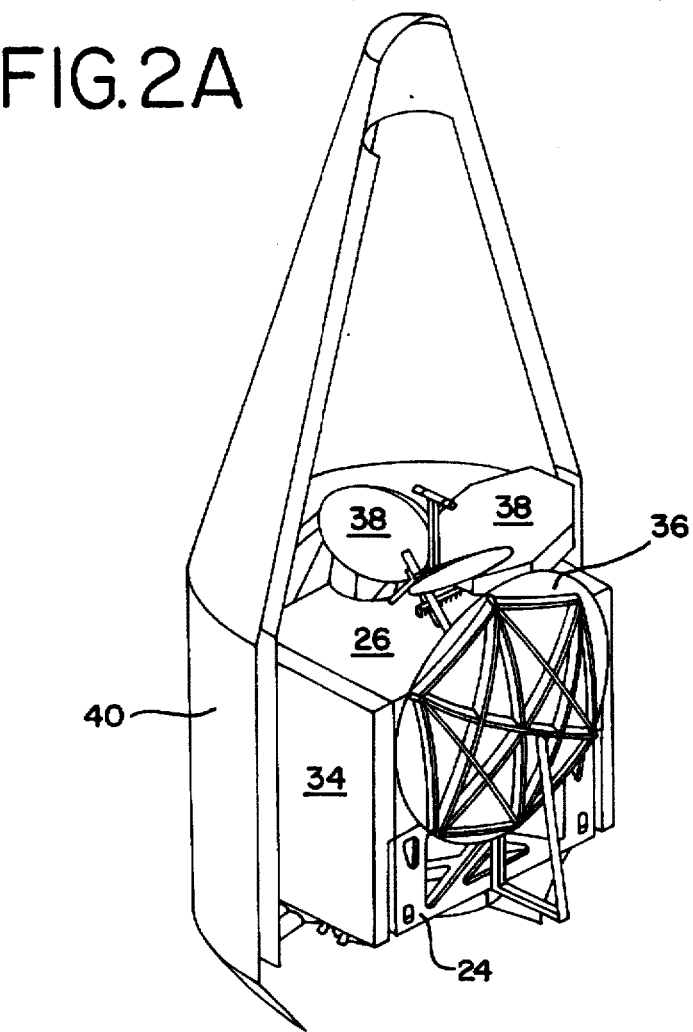
FIG. 2A shows the spacecraft or satellite body of FIG. 1 in a retracted or stored position on a launch vehicle.

As shown in FIG. 2A, spacecraft 20 is initially in a stored configuration when loaded on the launch vehicle 40. In the stored configuration, all peripheral components, such as the solar panels 34 and the antennae 36 are folded up to be adjacent to the spacecraft body 22. The peripheral components remain in their folded condition when the spacecraft 20 leaves the launch vehicle 40 and moves into a desired orbit. Once in the desired orbit, the peripheral elements are unfolded as shown in FIG. 1.

Figure 3:
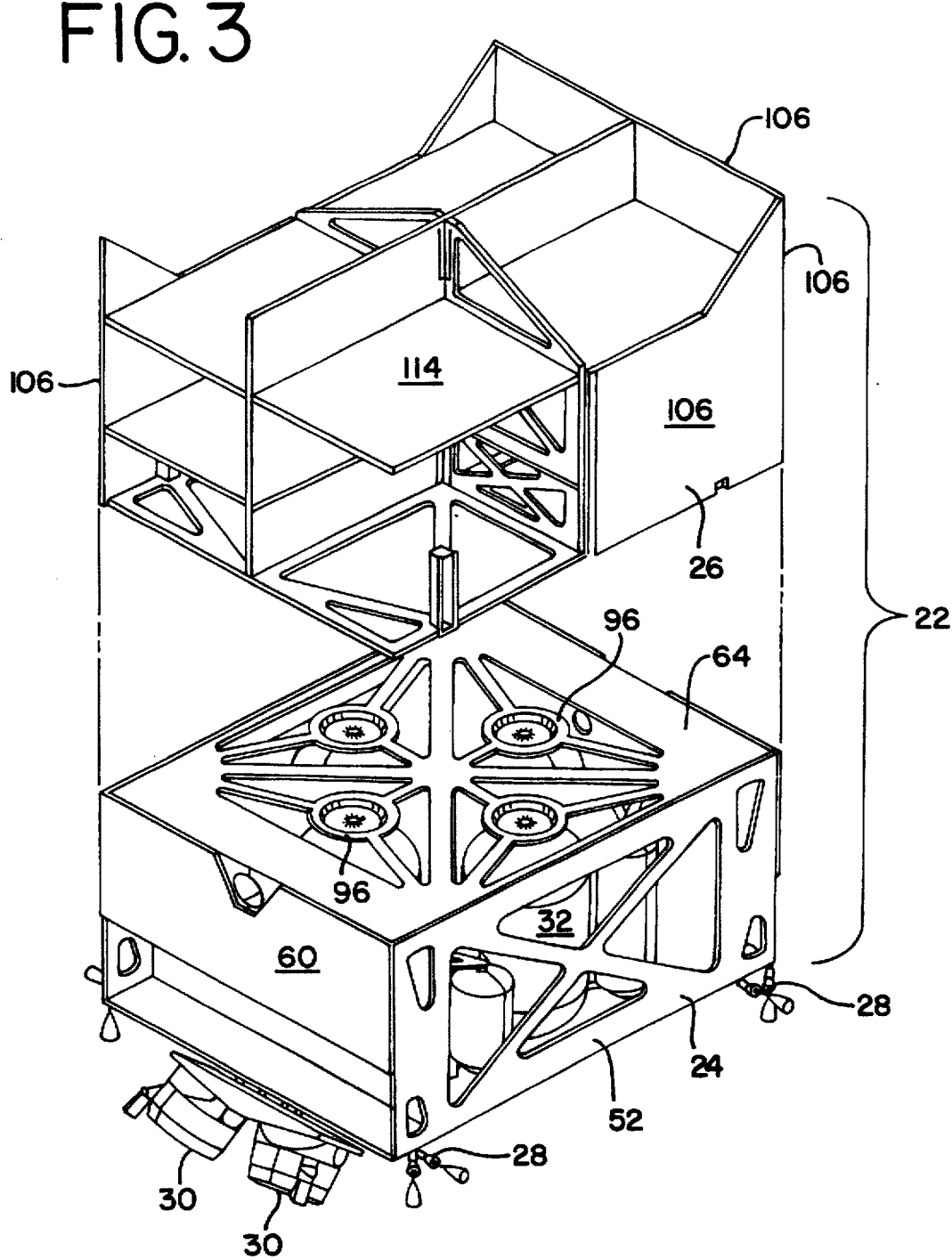
FIG. 3 shows a breakaway perspective view of the spacecraft body when the payload and bus modules of FIG. 1 are separated.
Figure 4:
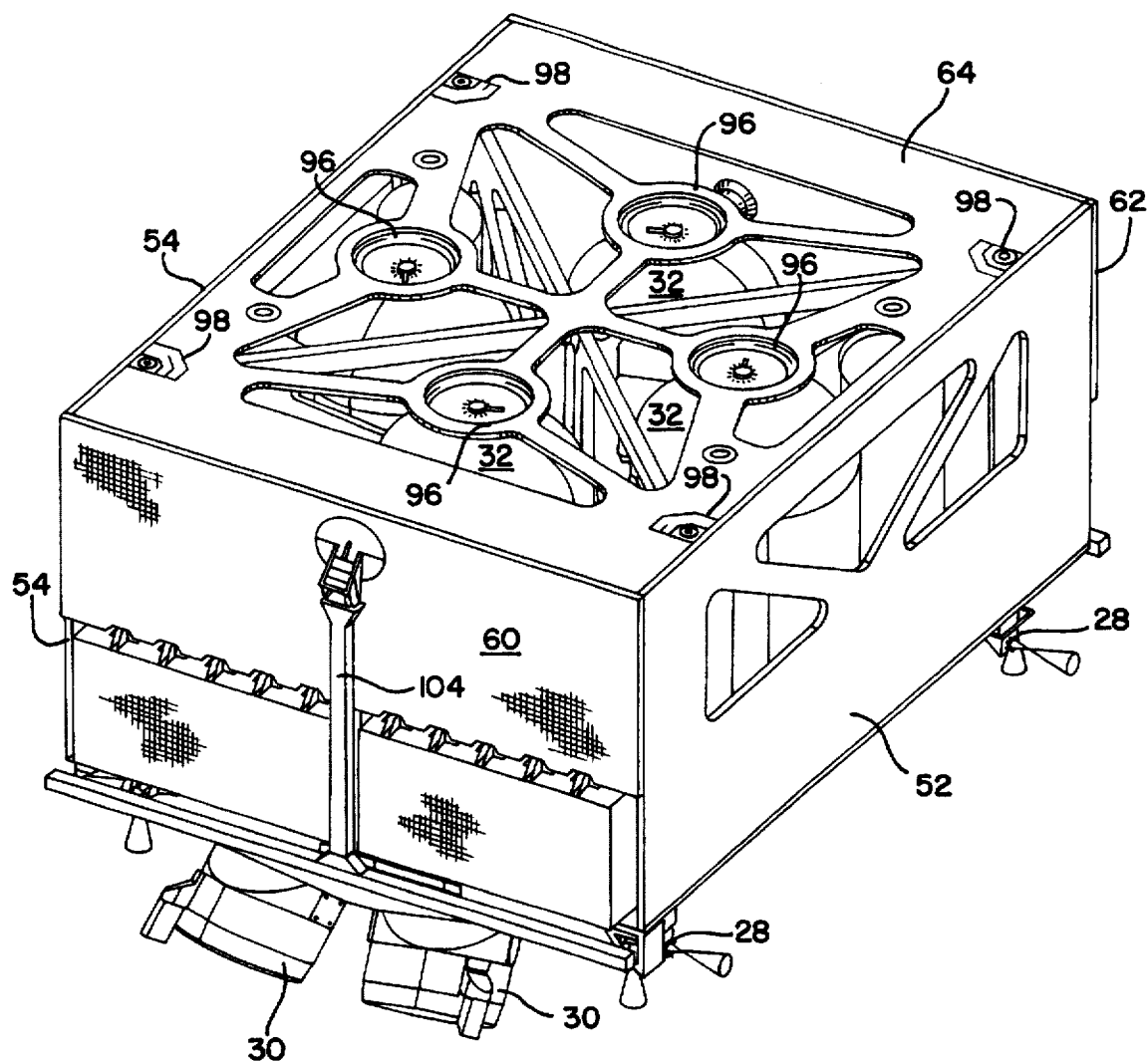
FIG. 4 shows a top perspective view of the bus module of FIG. 3.
Figure 5:
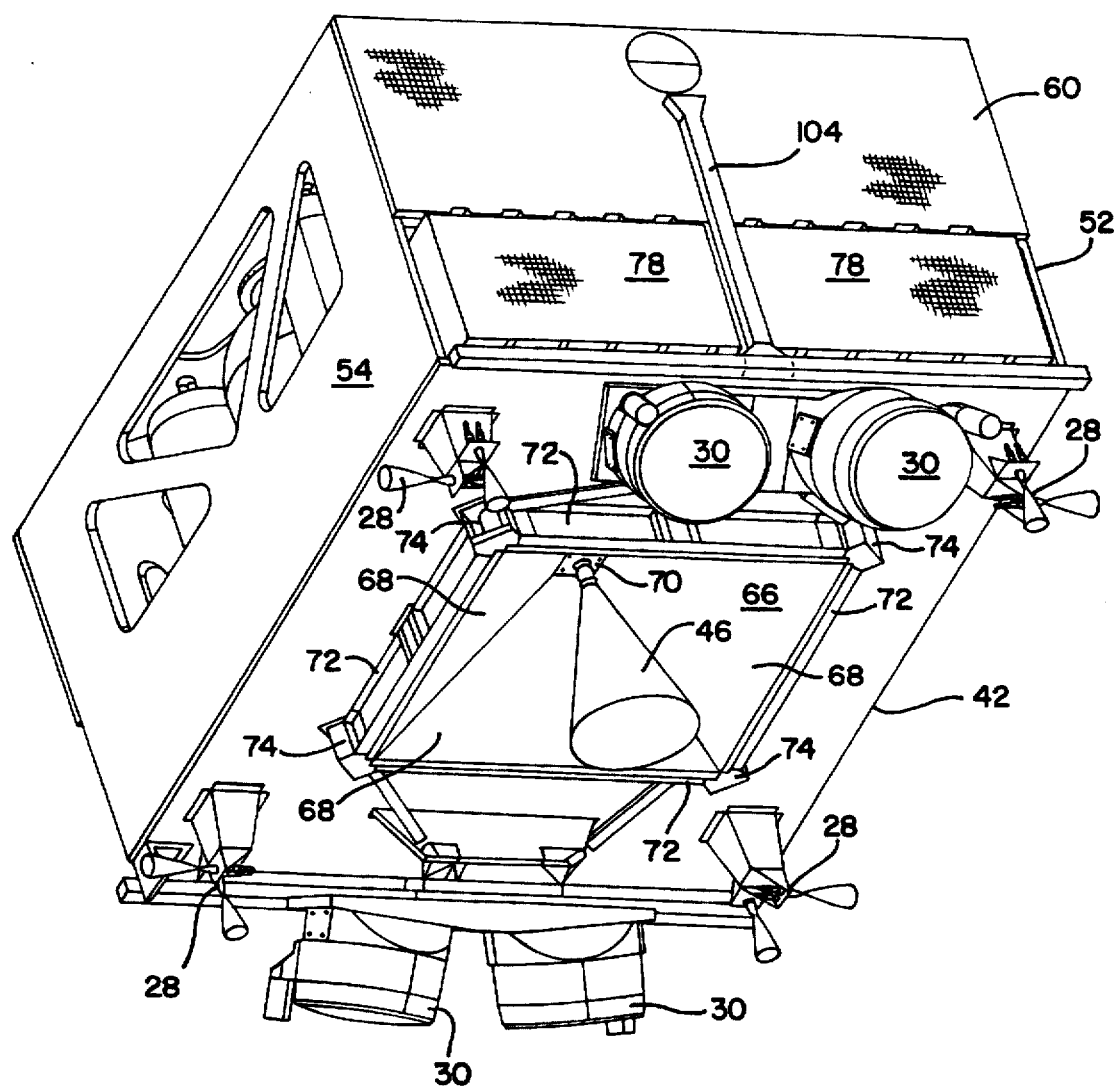
FIG. 5 shows a bottom perspective view of the bus module of FIG. 4.
Figure 6:
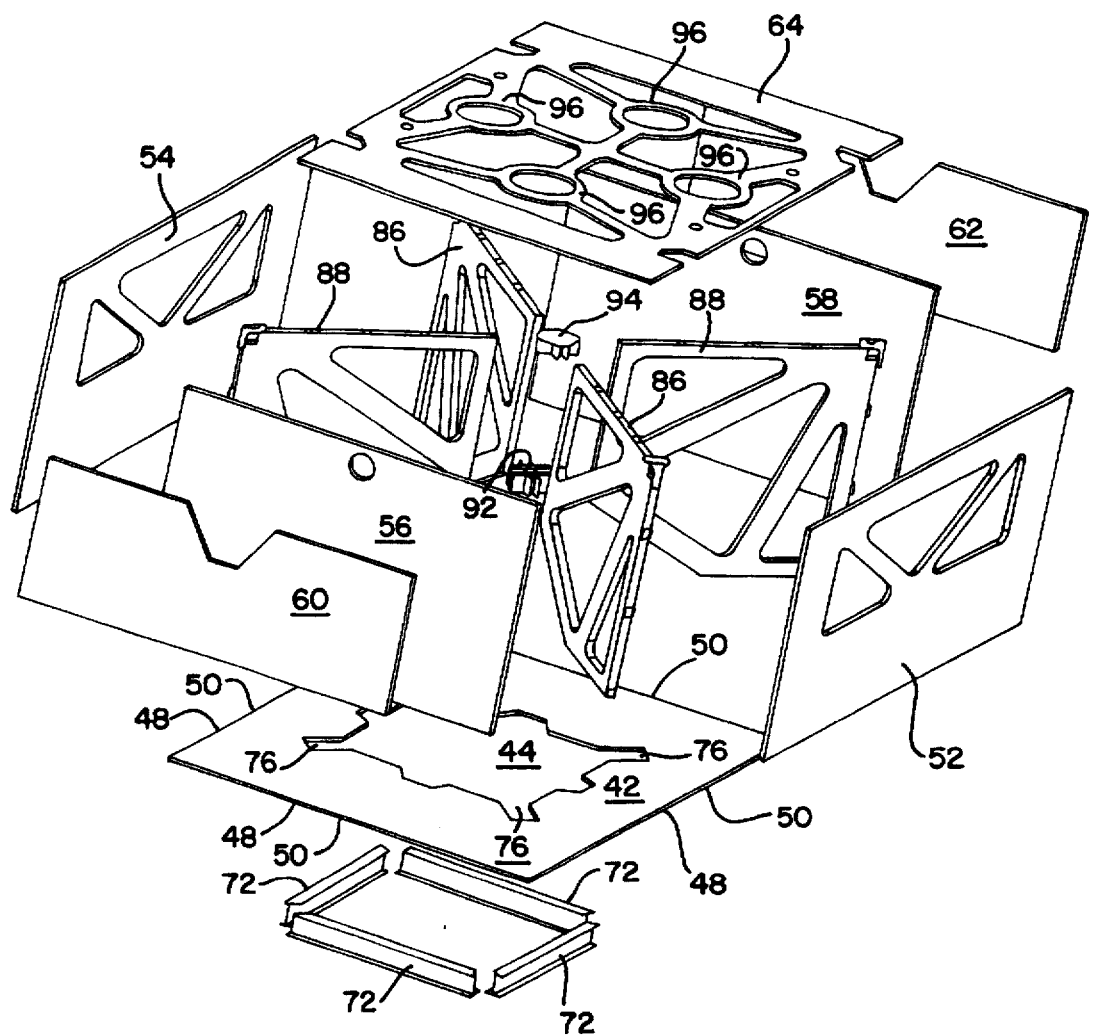
FIG. 6 shows an exploded view of the bus module of FIGS. 4-5.

Supporting the peripheral elements is the spacecraft body 22 as shown in FIG. 3. As mentioned previously, spacecraft body 22 includes a bus module 24 and a payload module 26. Bus module 24, as shown in FIGS. 3–11, includes a base 42 which has an opening 44 to allow a main orbital thruster nozzle 46 to be inserted therethrough. Base 42 has a perimeter 48 with four sides 50 which define a polygon, such as a rectangle or a square. Preferably, perimeter 48 has a length of approximately 175" and a width of approximately 100". Attached to the base 42 are four side walls 52, 54, 56 and 58. Side walls 52 and 54 face opposite each other and are attached to and positioned substantially perpendicular to sides 50. Likewise, side walls 56 and 58 are substantially perpendicular to and attached to base 42. Side walls 56 and 58 preferably lie approximately 12" from the perimeter 48 and are attached to side walls 52 and 54 so that a cross-section of the four side walls taken parallel to base 42 forms a polygon having two or more diagonals, such as a rectangle or a square. Besides side walls 52, 54, 56 and 58, a pair of exterior panels 60, 62 are attached to the ends of side walls 52 and 54 so that exterior panels 60 and 62 are parallel to and face side panels 56 and 58, respectively. The exterior panels 60 and 62 have a rectangular shape having a length of approximately 75" and a width of approximately 36". Panels 60 and 62 may be hinged or permanently attached. Attachment of the four side walls 50, 52, 54, 56 to the base 42 is accomplished in a well known manner, such as mechanical fastening or bonding. Mechanical fastening may include using threaded bolts and nuts. The side walls and exterior panels 60 and 62 attached to each other as well by mechanical fastening as described above.

A top panel or interface 64 is then attached, via a mechanical fastener, to all four side walls so that base 42, side walls 52, 54, 56, 58 and interface 64 enclose an interior volume of space. Within the interior volume of space, one or more fuel tanks 32 are located. Preferably, four of the fuel tanks 32 are in fluid communication with a main orbital engine (not shown) attached to the base 42 so that fuel is fed to the engine. The main orbital engine propels the satellite 20 into the proper orbit after the satellite 20 has left the launch vehicle 40. The main orbital thruster is supported on a pyramid-like plume shield 66 which has four panels 68 which extend upward through opening 44. Plume shield 66 is made of a titanium material with a nickel foil and quartz layer located on the exterior. Preferably, plume shield 66 has a square bottom base having sides with a length of approximately 45". Panels 68 are welded to each other and form a square opening 70 through which the nozzle 46 passes. Panels 68 are also attached to corresponding metal bars 72 which are attached to the underside of base 42. Metal bars 72 are attached to base 42 and to four fittings 74 by mechanical fasteners. Fittings 74 are likewise mechanically attached to the corner slots 76 of opening 44.

Besides the four fuel tanks 32 for the main orbital engine, there preferably are separate fuel tanks for each of the ion propulsion engines 30 and chemical engines 28. The interface 64 is also mechanically attached to the exterior panels 60 and 62 so that a volume of space is defined by base 42, interface 64 and exterior panels 60 and 62. As shown in FIG. 7, side walls 56 and 58 physically divide the volume of space into three areas I, II, and III, wherein each area is thermally, environmentally (i.e. micrometeorite shielding and Faraday cage) and structurally segregated from one another. As explained previously, the inner area I contains the main orbital engine and fuel tanks 32. Areas II and III contain power system components 78 and attitude control system components 80. The power system components 78 and the attitude control system components 80 may be thermally, environmentally, and structurally segregated from each other as well by a hinged shelf 82 which is hingedly attached to a side wall 56, 58 so that it can move from a stored position adjacent to side wall 56, 58 to a deployed position where the shelf is parallel to base 42 so that it can support components 80 thereon.

Other embodiments for shelf 82 are possible. First, shelf 82 can be hinged to a side wall 56, 58 so that it will be vertical to both side walls 56, 58 and base 42 when it moves to a deployed position. Second, a shelf 82 positioned parallel to base 42 may be movable so that the distance from the shelf 82 to base 42 can be varied. As shown in FIG. 8, this is accomplished by attaching the shelf 82 to one of a multiple number of connectors, such as holes 84, which extend from the base 42 to interface 64. It is understood that shelf 82 also may be permanently attached to walls 52, 54, 56, 58 and exterior panels 60 and 62.

Figure 10:
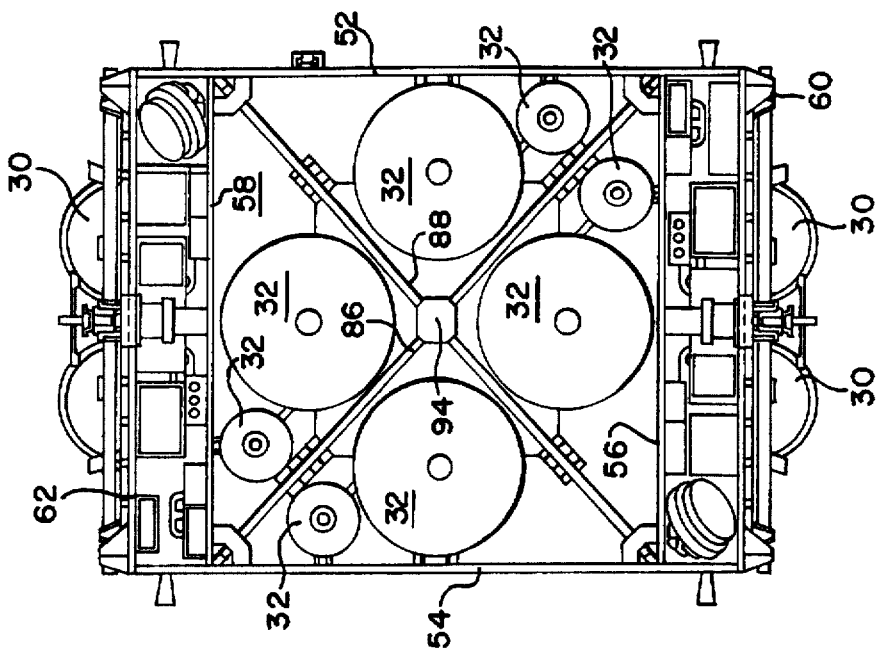
FIG. 10 shows a cross-sectional view of the bus module of FIG. 3.
Figure 9:
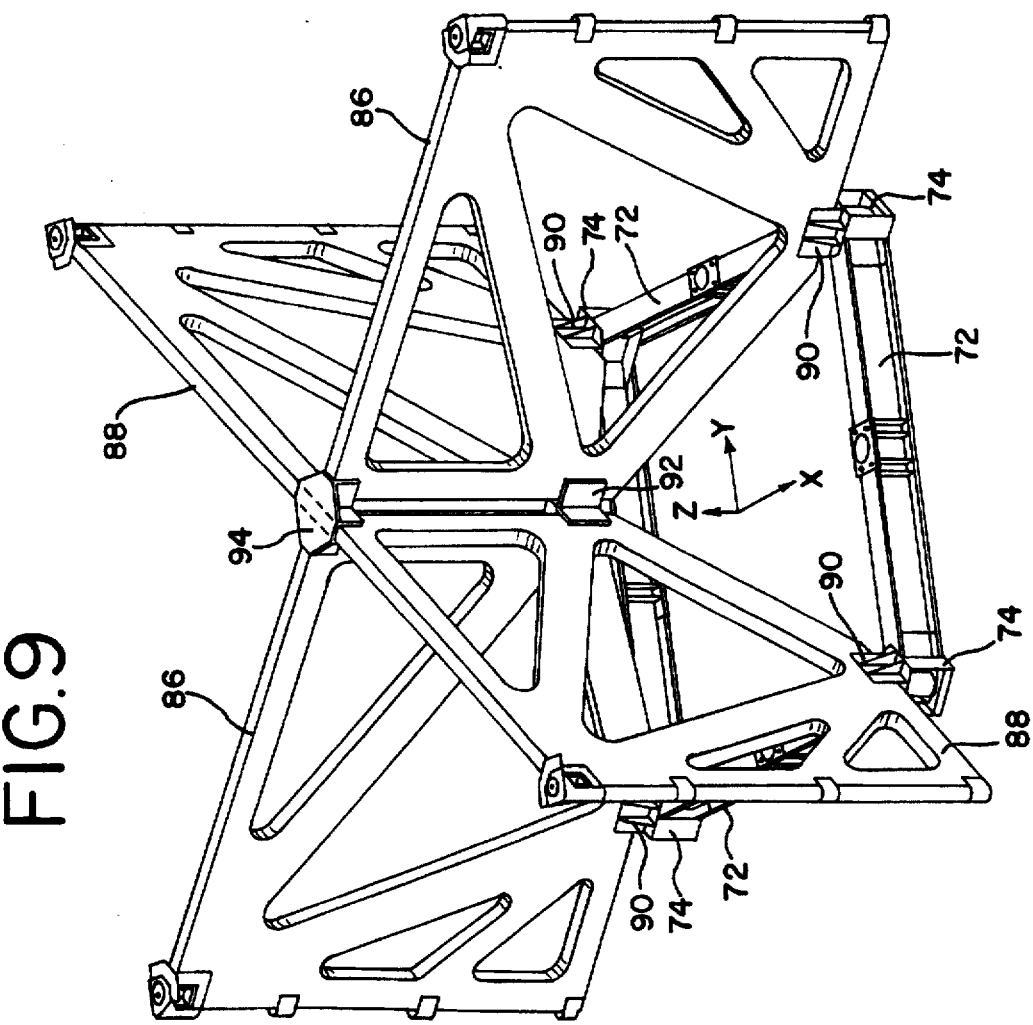
FIG. 9 shows a pair of support walls to be used with the bus module of FIGS. 3-6.

As described previously, area I pertains to a volume of space bounded by base 42, interface 64 and side walls 52, 54, 56 and 58. A cross-section of side walls 52, 54, 56 and 58 taken parallel to base 42 defines a polygon having two or more diagonals, such as a rectangle or a square. A pair of support walls 86, 88 are attached to base 42 via U-shaped fitting 90 (or via bonding) which are attached to fittings 74. The support walls 86, 88 are also attached to interface 64 and side walls 52, 54, 56 and 58 so that the entire length of the support walls lie along the entire length of each diagonal. Each support wall 86, 88 can be either of one piece or two piece construction. In the case of two piece construction, both halves of the support wall are attached to each other at the center of the volume of space by a bottom piece 92 and a top piece 94 which have slots to receive the halves, as shown in FIG. 9. The bottom and top pieces 92 and 94 are welded to each of the halves. The support walls 86, 88 so constructed preferably intersect one another at approximately 90° and define four areas which have a fuel tank 32, as shown in FIG. 10.

Figure 11:
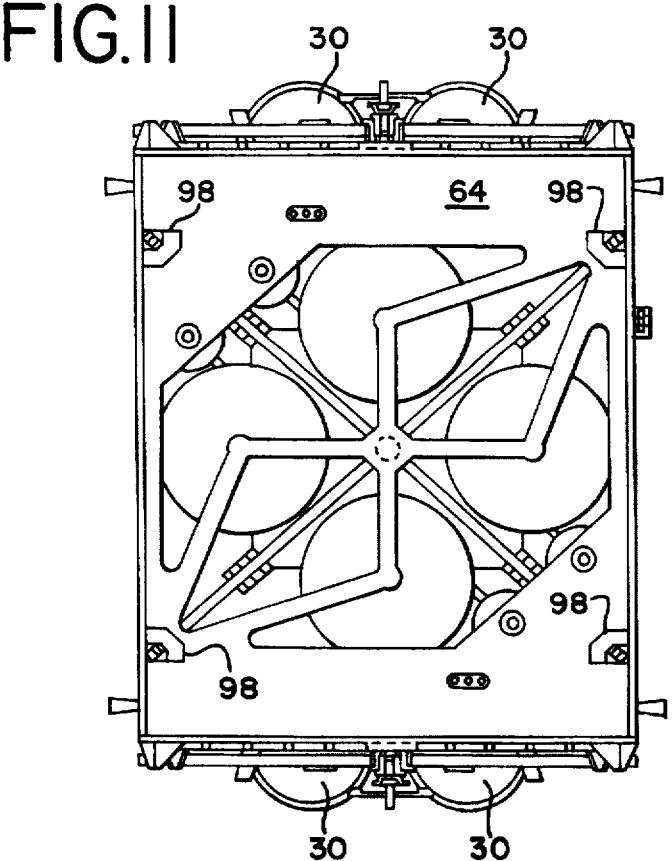
FIG. 11 shows an alternative embodiment of an interface for the bus module of FIG. 3.
Figure 12:
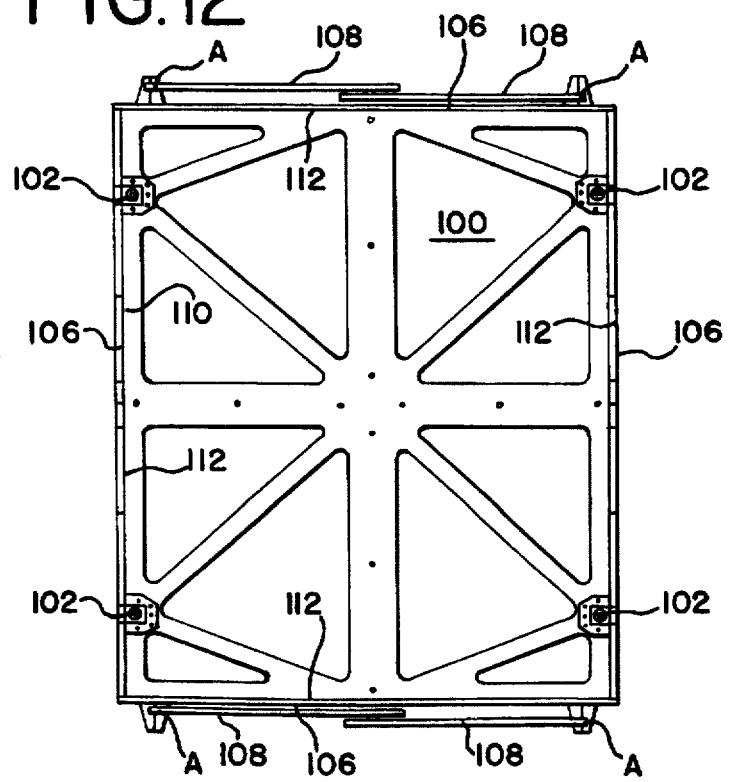
FIG. 12 shows an aft end view of the payload module of FIG. 3.

It should be noted that base 42, interface 64, side walls 52, 54, 56 and 58, support walls 86, 88, shelves 82 and panels 60 and 62 are preferably made of a suitable metallic and/or composite material, such as Kevlar or graphite, or by a process as described in U.S. Pat. No. 5,273,806, whose contents are incorporated herein by reference. Depending on the amount of isolation from the environment and strength requirements, a number of apertures can be formed in the base, interface, side walls, support walls and panels, so that the weight of the bus module 24 is reduced. As shown by a comparison of FIGS. 1-3 and 4-6, the shape of the apertures can take on various forms. An alternative shape for the apertures of interface 64 is shown in FIG. 11.

Fuel tanks 32 are further secured within bus module 24 by four collars 96 on flexible interface 64 which are attached via bolts to an annular surface of the fuel tank 14. Besides securing fuel tanks 32, interface 64 has a standardized structure designed to receive and attach itself to a standard aft end of a satellite payload module 26. The interface 64 has one or more attachment elements or engagement elements 98 which are always arranged thereon in a predetermined and standard pattern so that they receive one or more connection elements from a standard aft end 100 of a satellite payload module 26. Preferably, there is an engagement element 98, such as a standard mechanical interlock, located near each of the four corners of the interface 64. Similarly, the bus module 28 has an electrical port, such as an electrical pin connector, located at each corner of the interface 64 and near the engagement elements 98. In addition, the bus module or payload module can contain one or more voltage converters which can assure that the electrical voltages passed from the bus module to the payload module and vice versa are compatible.

The purpose of standardizing the structure of the interface 64 and the aft end of the payload module 26 is to allow attachment between a bus module with any payload module. This would allow for the bus and payload modules to be manufactured in different locations and by different corporate entities without worrying whether attachment will be achieved between the modules.

To this end, an embodiment of a payload module 26 is shown in FIGS. 3 and 12-14 which has an aft end or base 100 which always has an attachment device 102, such as a standard cone and socket attachment, arranged thereon at a position which corresponds to any one of the predetermined and standard locations on interface 64 which possess an engagement device 98. Thus, the bus module 24 is attached to payload module 26 by having the attachment device 102 of the payload module 26 engage with a corresponding engagement element or device 98 of the bus module 24. Of course, in order to achieve standardized attachment the number of predetermined and standard locations on the interface must be at least as large as the number of attachment devices 102 on the payload module 26. The payload module 26 is electrically powered via a power bus 104 attached to both modules.

Payload module 26 has four side walls 106 that are attached to base 100 and which meet at four corners. At each corner are a pair of connectors (not shown) or hinges (not shown) which are hingedly attached to a heat radiator 108 via a pivot member so that the heat radiator 108 is able to rotate about an axis A.

Base 100 has a perimeter 110 with four sides 112 which define a polygon, such as a rectangle or a square. Preferably perimeter 110 matches the perimeter of interface 64 so that it has a length of approximately 100" and a width of approximately 75". Side walls 106 are attached to and positioned substantially perpendicular to sides 112. A top panel 114 is then mechanically attached to all four side walls 106 so that base 100, side walls 106 and top panel 114 enclose an interior volume of space in which the payload is located. Attachment of the four side walls 106 to base 100 is accomplished in a well known manner, such as bolts or bonding.

Figure 13:
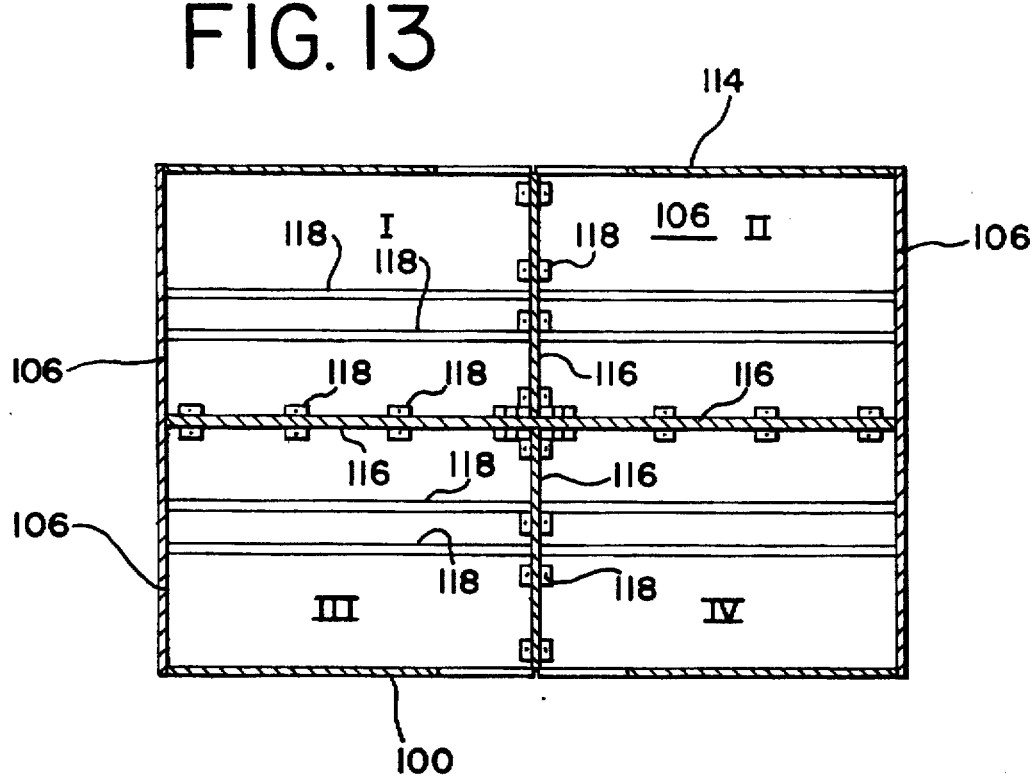
FIG. 13 shows a cross-sectional view of a side of the payload module of FIG. 3.
Figure 14:
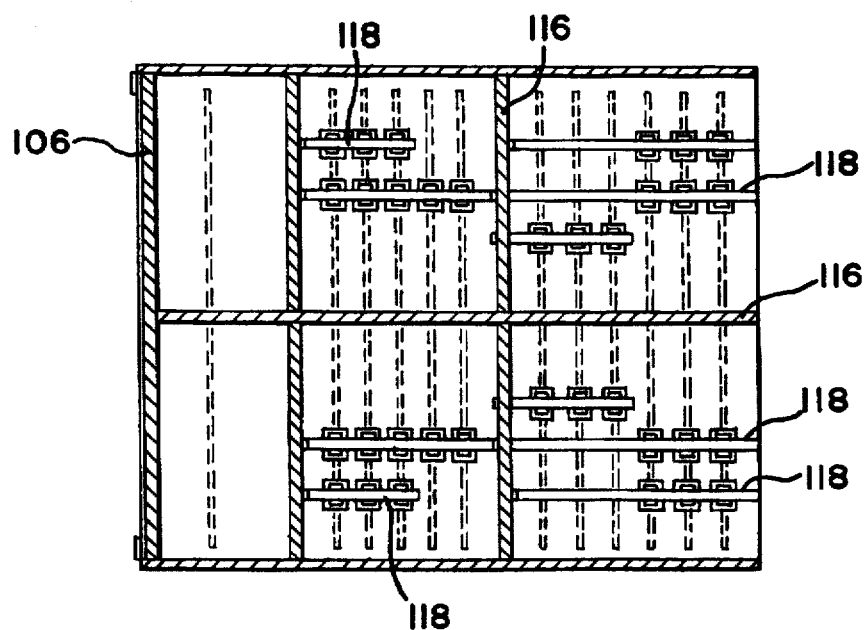
FIG. 14 shows a cross-sectional view of the front of payload module of FIG. 3.

As shown in FIGS. 13 and 14, a pair of support walls 116 are attached to base 100 so that they are perpendicular to sides 112 and perpendicular to each other. Attachment is accomplished in a well known manner by way of brackets 118 which are attached along the length and width of oppositely facing side walls 106, as shown in FIG. 13. Support walls 116 in conjunction with side walls 106, base 100 and top panel 114 form four thermally, environmentally and structurally segregated areas I, II, III, IV. As with the bus module 24, the number of segregated areas can be increased by adding one or more shelves 118, as shown in FIGS. 13 and 14. Shelves 118 are attached as and can take on the structure of any of the embodiments of shelf 80 of bus module 24 as described above.

Like bus module 24, the base 100, top panel 114, side walls 106 and shelves 118 are preferably made by a process as described in U.S. Pat. No. 5,273,806. Depending on the amount of isolation from the environment and strength requirements, a number of apertures can be formed in the base, top panels, side walls, and support walls, so that the weight of the payload module 26 is reduced.

Besides the box-like shape of FIGS. 1-14, it is envisioned that the bus module 24 and/or the payload module 26 may have a cylindrical shape. As shown in FIGS. 15 and 16A, the base 120 of such a bus module 24 has circular perimeter 122 which is attached to an inner side wall 124 and an exterior side wall 126. Attached to the inner and outer side walls is a circular interface 128 having the standardized pattern of attachment devices as described above for interface 64. The side walls define two areas I and II which are structurally and thermally isolated from one another. As before, area I can contain one or more fuel tanks 32 which are separated from one another by a pair of support walls 130 which lie along the entire length of diameters of the circular perimeter. Preferably the support walls are angled at 90° to each other and are attached as previously described for the embodiment of FIGS. 1-14.

Similarly, a cylindrical payload module 26 (see FIGS. 15 and 16B) would have a circular standard aft end or base 132 which is structured like base 100 described above, so as to allow for standardized connection with interface 128. A pair of side wall 134, 136 and a pair of support walls 138, 140 are attached to base 132 and a circular top panel 142 in the manner as described above for the payload module of FIGS. 1-14.

In summary, the present invention provides an improved structure for a payload module and a bus module. In particular, the present invention leads to a way of more efficiently constructing satellites by standardizing the attachment between payload and bus modules. The present invention regards a modular design which provides for improved installation of components on a spacecraft by segregating the components thermally, environmentally and structurally.

The foregoing description is provided to illustrate the invention, and is not to be construed as a limitation. Numerous additions, substitutions and other changes can be made to the invention without departing from its scope as set forth in the appended claims.

We claim:

1. A space module comprising:

a base;

a plurality of side walls attached to said base; and a top panel attached to at least one of said side walls, wherein said base, at least one of said side walls and said top panel enclose an interior volume of space;

wherein said volume of space is physically divided into a first area and a second area, wherein said first and second areas are thermally and structurally segregated from one another;

wherein the plurality of sidewalls are attached to said base so that a cross-section of said side walls taken parallel to said base defines a polygon having at least four vertices and at least two diagonals, each diagonal extending between two of the vertices; and further comprising a support wall lying within said interior volume of space and along the entire length of one of said diagonals and attached to said base and said top panel.

2. The space module of claim 1, comprising a second support wall lying within said interior volume of space and along the entire length of a second one of said diagonals and attached to said base and said top panel.

3. The space module of claim 1, wherein said polygon comprises a rectangle.

4. The space module of claim 1, wherein said top panel is attached to at least two of said plurality of side walls; and wherein said base, said at least two of said plurality of side walls and said top panel enclose said interior volume of space.

5. A space module comprising:

a base;

a plurality of side walls attached to said base;

a top panel attached to at least one of said side walls, wherein said base, at least one of said side walls and said top panel enclose an interior volume of space; and a first support wall lying within said interior volume of space and attached to two of said plurality of side walls;

a second support wall lying within said interior volume of space and attached to another two of said plurality of side walls;

wherein said volume of space is physically divided into a first area and a second area, wherein said first and second areas are thermally and structurally segregated from one another;

wherein a cross-section of said plurality of side walls taken parallel to said base defines a polygon; and wherein said first and second support walls intersect one another at an angle of 90°.

6. The space module of claim 5, wherein said polygon comprises a rectangle.

7. A space module comprising:

a base;

a plurality of side walls attached to said base;

a top panel attached to at least one of said plurality of side walls, wherein said base, at least one of said side walls and said top panel enclose an interior volume of space; and a shelf attached to one of said plurality of side walls, said shelf separating said first area from said second area;

wherein said volume of space is physically divided into a first area and a second area, wherein said first and second areas are thermally and structurally segregated from one another; and wherein said shelf pivots from a stored position to a deployed position where said shelf separates said first area from said second area.

8. The space module of claim 7, wherein said top panel is attached to at least two of said plurality of side walls; and wherein said base, said at least two of said plurality of side walls and said top panel enclose said interior volume of space.

* * * * *